United States Patent
Umemoto et al.

(10) Patent No.: US 10,072,187 B2
(45) Date of Patent: Sep. 11, 2018

(54) PRESSURE-SENSITIVE ADHESIVE COMPOSITION, PRESSURE-SENSITIVE ADHESIVE LAYER, PRESSURE-SENSITIVE ADHESIVE MEMBER AND IMAGE DISPLAY, AND METHOD FOR PEELING OFF OPTICAL FILM FROM AN IMAGE DISPLAY AND METHOD FOR REMOVING DISPLAY PANEL FROM IMAGE DISPLAY

(75) Inventors: Seiji Umemoto, Ibaraki (JP); Masakuni Fujita, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 439 days.

(21) Appl. No.: 12/921,032

(22) PCT Filed: Mar. 12, 2009

(86) PCT No.: PCT/JP2009/054767
§ 371 (c)(1),
(2), (4) Date: Sep. 3, 2010

(87) PCT Pub. No.: WO2009/113616
PCT Pub. Date: Sep. 17, 2009

(65) Prior Publication Data
US 2011/0008552 A1    Jan. 13, 2011

(30) Foreign Application Priority Data

Mar. 13, 2008 (JP) ................................ 2008-063513

(51) Int. Cl.
| C09J 133/08 | (2006.01) |
| C09J 133/02 | (2006.01) |
| C09J 11/06 | (2006.01) |
| C09J 7/38 | (2018.01) |

(52) U.S. Cl.
CPC .............. *C09J 133/02* (2013.01); *C09J 7/38* (2018.01); *C09J 11/06* (2013.01); *C09J 133/08* (2013.01); *C09J 2433/00* (2013.01); *Y02P 20/582* (2015.11); *Y10T 156/1153* (2015.01); *Y10T 428/1059* (2015.01); *Y10T 428/28* (2015.01); *Y10T 428/283* (2015.01); *Y10T 428/2848* (2015.01)

(58) Field of Classification Search
CPC ...... C09J 133/02; C09J 133/08; C09J 133/10; C09J 2433/00; C09J 11/06; Y02P 20/582; Y10T 428/28; Y10T 428/2848; Y10T 428/283; Y10T 428/1059; Y10T 156/1153
See application file for complete search history.

(56) References Cited

U.S. PATENT DOCUMENTS

| 4,049,483 | A | * | 9/1977 | Loder et al. ................. 156/230 |
| 5,179,158 | A | * | 1/1993 | Azuma et al. ................ 524/748 |
| 5,270,358 | A | * | 12/1993 | Asmus ............................ 524/55 |
| 5,670,557 | A | * | 9/1997 | Dietz et al. .................... 522/184 |
| 6,582,789 | B1 | * | 6/2003 | Sumi ............................ 428/40.1 |
| 6,984,413 | B2 | * | 1/2006 | Yamamoto et al. ....... 427/208.4 |
| 7,291,223 | B2 | * | 11/2007 | Lazarev .......................... 117/68 |
| 7,655,285 | B2 | * | 2/2010 | Cho et al. .................... 428/1.54 |
| 7,713,545 | B2 | * | 5/2010 | Kamiya et al. .............. 424/450 |
| 2002/0035177 | A1 | | 3/2002 | Kishioka et al. |
| 2006/0051406 | A1 | * | 3/2006 | Parmar ........................ 424/450 |
| 2006/0057368 | A1 | | 3/2006 | Kobayashi et al. |
| 2006/0057371 | A1 | | 3/2006 | Kobayashi et al. |
| 2006/0160248 | A1 | * | 7/2006 | Kamiya et al. .................. 438/1 |
| 2007/0014985 | A1 | * | 1/2007 | Yuan-Huffman et al. ................... 428/355 R |
| 2007/0078197 | A1 | | 4/2007 | Samuelsen |
| 2007/0169885 | A1 | * | 7/2007 | Mikuni et al. ................ 156/325 |
| 2008/0134939 | A1 | * | 6/2008 | Arpac et al. ............ 106/287.23 |
| 2009/0022780 | A1 | | 1/2009 | Scherer et al. |
| 2009/0202641 | A1 | * | 8/2009 | Asakawa et al. ............ 424/488 |

FOREIGN PATENT DOCUMENTS

| CN | 1152760 A | 6/1997 |
| EP | 0577385 A1 | 1/1994 |
| EP | 1 743 927 A2 | 1/2007 |
| JP | 58-101174 A | 6/1983 |
| JP | 63-256672 A | 10/1988 |
| JP | 06-108031 A | 4/1994 |
| JP | 6-128496 A | 5/1994 |
| JP | 06-247847 A | 9/1994 |
| JP | 7-278505 A | 10/1995 |
| JP | H09-095650 A | 4/1997 |
| JP | 09-114382 A | 5/1997 |
| JP | 11-095012 A | 4/1999 |

(Continued)

OTHER PUBLICATIONS

Chinese Office Action dated Apr. 5, 2012, issued in corresponding Chinese Patent Application No. 200980106064.7, (w/English translation, 7 pages).

Kansai Paint Co., Ltd., Technical Department "Basic and Latest Technologies of Aqueous Paint," Easy-to-understand technical commentary series, Sep. 2001, vol. 5, pp. 41-42, published by Coating Media Tokyo Japan.

Fujimoto, Takehiko "Basic Properties and Effects of Surfactants," Introduction to Surfactants, Jun. 2007, pp. 14-21, published by Sanyo Chemical Industries, Ltd., Kyoto Japan, cited in ISR.

Fujimoto, Takehiko "Introduction to Surfactants", Jun. 2007, pp. 157-158, published by Sanyo Chemical Industries, Ltd., Kyoto Japan.

(Continued)

*Primary Examiner* — Scott R Walshon
(74) *Attorney, Agent, or Firm* — Westerman, Hattori, Daniels & Adrian

(57) ABSTRACT

The pressure-sensitive adhesive composition of the invention includes a base polymer; and amphiphilic molecule particles that have an aggregate structure of amphiphilic molecules having hydrophilic group and hydrophobic group in the same molecule. The pressure-sensitive adhesive has stable adhesive characteristics and can be reduced in adhesive strength in a desired manner depending on how it is to be used.

33 Claims, No Drawings

(56) References Cited

FOREIGN PATENT DOCUMENTS

| | | | |
|---|---|---|---|
| JP | 2002-047463 A | | 2/2002 |
| JP | 2004-256414 A | | 9/2004 |
| JP | 2004256414 A | * | 9/2004 |
| JP | 2004-285297 A | | 10/2004 |
| JP | 2005-154602 A | | 6/2005 |
| JP | 2006-111846 A | | 4/2006 |
| JP | 2006-111856 A | | 4/2006 |
| JP | 2006-249273 A | | 9/2006 |
| JP | 2007-224187 A | | 9/2007 |
| JP | 2009-209257 A | | 9/2009 |
| TW | 327687 | | 10/1985 |
| WO | WO 2005082514 A2 | * | 9/2005 |
| WO | 2007/088038 A1 | | 8/2007 |
| WO | WO 2007145158 A1 | * | 12/2007 |

OTHER PUBLICATIONS

Soichi, Muroi "3.1 Stabilizing Protective Layer," New Polymer Library 22: Polymer Latex Adhesives, Jun. 1984, pp. 41-42, 1st edition, published by Polymer Publishing Society Co., Ltd, Kyoto, Japan.
"229 Cyclodextrin," Iwanami Dictionary of Physics and Chemistry, Apr. 1998, pp. 576-577, 5th edition, edited by Nagakura Saburo et al., published by Iwanami Shoten Co., Ltd, Tokyo, Japan, cited in ISR.
International Search Report of PCT/JP2009/054767, dated Jun. 2, 2009.
Notification of Transmittal of Translation of the International Preliminary Report on Patentability ( Form PCT/IB/338) of International Application No. PCT/JP2009/054767 dated Nov. 11, 2010 with Form PCT/IPEA/409.
Extended European Search Report of EP09721169, completion date Nov. 8, 2011.
Chinese Office Action dated Nov. 5, 2012, issued in corresponding Chinese Patent Application No. 200980106064.7, English translation (12 pages).
Japanese Office Action dated Sep. 10, 2013, issued in corresponding Japanese Patent Application No. 2009-058378, w/ English translation.
Chinese Office Action dated Jul. 19, 2013, corresponding Application No. 200980106064.7 w/English translation.
Office Action dated Jan. 6, 2015, issued in corresponding Chinese Patent Application No. 201310122649.6, with English translation (9 pages).
Office Action dated Jan. 15, 2015, issued in Korean Patent Application No. 10-2010-7022337, with English translation (8 pages).
Chinese Office Action dated Feb. 12, 2014, issued in corresponding Chinese Patent Application No. 200980106064.7 with English translation (6 pages).
Chinese Office Action dated Apr. 22, 2014, issued in corresponding Chinese Patent Application No. 201310122649.6 with English translation (12 pages).
Taiwanese Search Report dated Sep. 16, 2014, issued in corresponding Taiwanese Application No. 098108305; w/English Translation. (11 pages).
Notice of Final Rejection dated Jul. 31, 2015, counterpart Korean Application No. 10-2010-7022337, with English translation. (5 pages).
Decision of Refusal dated Feb. 3, 2016, issued in counterpart Japanese Patent Application No. 2014-190802, with English translation. (8 pages).
Office Action dated Feb. 2, 2016, issued in counterpart Chinese Patent Application No. 200980106064.7, with English translation. (12 pages).
Office Action dated Nov. 6, 2015, issued in counterpart Japanese Application No. 2014-190802, with English translation. (8 pages).
Decision of Intellectual Property Trial and Appeal Board dated Jul. 24, 2017, issued in counterpart Korean Application No. 10-2010-7022337, with English translation. (23 pages).
Office Action dated Apr. 27, 2017, issued in counterpart Japanese Application No. 2014-190802, with English translation. (17 pages).
Office Action dated Feb. 27, 2017, issued in counterpart Korean Application No. 10-2015-702873, with English translation (8 pages).

* cited by examiner ical film, a separator and so on. Examples of the optical film
PRESSURE-SENSITIVE ADHESIVE COMPOSITION, PRESSURE-SENSITIVE ADHESIVE LAYER, PRESSURE-SENSITIVE ADHESIVE MEMBER AND IMAGE DISPLAY, AND METHOD FOR PEELING OFF OPTICAL FILM FROM AN IMAGE DISPLAY AND METHOD FOR REMOVING DISPLAY PANEL FROM IMAGE DISPLAY

TECHNICAL FIELD

The invention relates to a pressure-sensitive adhesive composition, a pressure-sensitive adhesive layer made from the pressure-sensitive adhesive composition, and a pressure-sensitive adhesive member including a support base material and the pressure-sensitive adhesive layer provided on the support base material. Examples of the support base material for the pressure-sensitive adhesive member include an optical film, a separator and so on. Examples of the optical film include a polarizing plate, a retardation plate, an optical compensation film, a brightness enhancement film, and a laminate thereof. Particularly when the pressure-sensitive adhesive member includes an optical film as the support base material and the pressure-sensitive adhesive layer formed thereon, it is useful as a pressure-sensitive adhesive optical film and may be used in image displays such as liquid crystal displays, organic electroluminescent (EL) displays, and plasma display panels (PDPs).

The invention also relates to a method for peeling off an optical film from the image display and a method for removing a display panel from the image display.

BACKGROUND ART

In a process of forming an image display such as a liquid crystal display, various optical films for forming the display, such as polarizing plates and retardation plates are attached to an object such as a liquid crystal cell with a pressure-sensitive adhesive layer interposed therebetween. The pressure-sensitive adhesive layer is often previously provided on one side of the optical film, because it is advantageous in that the optical film can be instantly fixed onto a display panel such as a liquid crystal cell and that no drying process is necessary to fix the optical film.

Essential properties required of the pressure-sensitive adhesive include the stably adhesive characteristic for the optical films attached to a liquid crystal cell or the like during the life-span of an image display. On the other hand, even when misalignment occurs or foreign matter is caught on the attaching surface in the process of attaching an optical film (the adherend) to a liquid crystal cell or the like, the optical film should be reworkable so that it can be peeled off from the liquid crystal cell and attached again. In view of environment countermeasure such as recycling or disposal, the optical film should be easily peeled off from the liquid crystal cell or the like at the end of the life of the image display.

A glass substrate designed specifically for use in a liquid crystal cell has a thickness of about 0.7 mm. Since the area of liquid crystal displays themselves has been steadily increasing in the field of televisions and monitors, breakage such as breakage of the glass substrate during the peeling off of the optical film can more frequently occur. In addition, a glass substrate for use in a mobile liquid crystal display is reduced in thickness by etching in terms of reducing the weight and the thickness. Such a glass substrate is thinner than 0.4 mm, which makes difficult the peeling off of optical films.

There is a trade-off between the adhesive characteristic and the easy peelability. If one of these properties is satisfied, the other will be degraded. If the pressure-sensitive adhesive layer sufficiently offers the adhesive characteristic, and, for example, if an increased adhesive strength is provided during reworking or particularly after adhesion for a long time, the process of peeling off an optical film from a display panel may result in breakage of the display panel or the like. On the other hand, if the adhesive strength of the pressure-sensitive adhesive layer is reduced so that the peelability can be high during reworking or at the end of the life of the image display, a problem with adhesion reliance may occur, such as peeling of the optical film during the operation of the image display.

Particularly when optical films such as polarizing plates (polarizers and transparent protective films), optical compensation films and brightness enhancement films (reflective polarizer) are used with a pressure-sensitive adhesive or an adhesive as needed to form a laminated structure in an image display, the total thickness of the optical films may reach about ⅕ to about ½ of the thickness of the image display. Also in view of recycling of display panel materials, therefore, peeling off of optical films from a display panel composed mainly of glass has been desired.

When the image display is used in a normal environment, such optical films serve to impart toughness so that the display panel produced with glass can be prevented from breaking. Therefore, conventional pressure-sensitive adhesives have been designed based on adhesion reliance and not designed from the viewpoint of recycling, although it is very important to peel off optical films from the display panel in the process of recycling the image display. Particularly after the display panel is used for a long time, the optical films are attached to the display panel by a strong force based on the adhesive strength of the pressure-sensitive adhesive, and in general cases, the adhesive strength increases with time. Therefore, when the image display is recycled, the glass part of the display panel frequently breaks in the process of peeling off the optical films from the display panel, which is not preferred for recycling and poses a risk of injury by glass fragments.

There is a method of recycling an image display, which includes peeling off an optical film using a solvent capable of dissolving a pressure-sensitive adhesive. In general, however, solvent resistance is imparted to the optical film for use, and therefore, in the recycling method with a solvent, it is difficult to allow the solvent to sufficiently reach and dissolve the pressure-sensitive adhesive layer covered with the optical film. Thus, the recycling method with a solvent needs a large amount of solvent and a long time. In the recycling method with a solvent, it is also difficult to successfully discard the solvent in which the pressure-sensitive adhesive is dissolved, which may cause significant problems with efficiency and environmental issues.

In order to achieve both the adhesive characteristic and the easy peelability for reworking, it is proposed to add a block polyisocyanate compound to a pressure-sensitive adhesive (Patent Document 1). Patent Document 1 discloses that the block polyisocyanate compound causes crosslinking at a temperature of 120° C. or more so that the adhesive strength can be reduced to such a level that peeling off can be easily performed. However, it is also expected that if the block polyisocyanate compound is heated at a relatively low temperature of 80° C. under actual operation conditions, a certain degree of dissociation may be caused by crosslinking, so that the adhesive strength of the pressure-sensitive adhesive layer may be reduced and separation or peeling of the optical film may occur before the end of the life of the image display. There is also concern that the decomposition of the block polyisocyanate compound may generate poisonous gas such as phenol or amine to affect the environment.

It is also proposed to add a solid foaming agent or a microcapsule foaming agent to a pressure-sensitive adhesive (Patent Document 2). Patent Document 2 discloses that gas is generated from the foaming agent by heating to reduce the contact area with the adherend, so that the adhesive strength is reduced. Concerning the solid foaming agent, however, ammonium carbonate disclosed as an example is decomposed at a low temperature (58° C.) and therefore insufficiently stable over time. It is also considered that since the solid foaming agent is gradually decomposed over a long time, gas cannot sufficiently be generated even after the end of the life of the image display, so that the adhesive strength cannot be reduced. The ammonium carbonate also has the problem of the generation of carbon dioxide, which puts stress on environment, and toxic ammonia. The microcapsule foaming agent is also not preferred, because the capsule size cannot be reduced, so that light scattering may occur to impart a haze to the pressure-sensitive adhesive itself. It is also considered that if the capsule does not have uniform strength, foaming may occur at a temperature lower than the original foaming temperature.

Besides the above, it is also proposed that particles with an average particle size of 0.5 to 15 µm should be dispersed in a pressure-sensitive adhesive (Patent Document 3). However, the function of the particles dispersed in the pressure-sensitive adhesive disclosed in Patent Document 3 is only to scatter the light passing through the pressure-sensitive adhesive layer. Therefore, the adhesive strength of the pressure-sensitive adhesive cannot be controlled using such dispersed particles.

PRIOR ART DOCUMENTS

Patent Document 1: JP-A No. 06-108031
Patent Document 2: JP-A No. 2004-285297
Patent Document 3: JP-A No. 11-095012

DISCLOSURE OF INVENTION

Problems to be Solved by the Invention

An object of the invention is to provide a pressure-sensitive adhesive that has stable adhesive characteristics and can be reduced in adhesive strength in a desired manner depending on how it is to be used.

Another object of the invention is to provide a pressure-sensitive adhesive layer made from such a pressure-sensitive adhesive, to provide a pressure-sensitive adhesive member having such a pressure-sensitive adhesive layer and to provide an image display produced using such a pressure-sensitive adhesive optical film as a pressure-sensitive adhesive member.

A further object of the invention is to provide a method for peeling off an optical film from an image display including an optical film and a display panel which are attached together with the pressure-sensitive adhesive layer and to provide a method for removing the display panel from such an image display.

Means for Solving the Problems

As a result of intensive investigations for solving the above problems, the inventors have found that the objects can be achieved with the pressure-sensitive adhesive and so on described below and thus have completed the invention.

The invention relates to a pressure-sensitive adhesive composition, including: a base polymer; and amphiphilic molecule particles that have an aggregate structure of amphiphilic molecules having hydrophilic group and hydrophobic group in the same molecule.

In the pressure-sensitive adhesive composition, the amphiphilic molecules are preferably solid at room temperature (23° C.) and normal pressure (1 atm) to form the amphiphilic molecule particles.

In the pressure-sensitive adhesive composition, the amphiphilic molecule particles are preferably an amphiphilic molecule crystal having a structure in which the amphiphilic molecules are aligned. And the amphiphilic molecule crystal preferably has a spherical, hollow spherical, hollow fibrous, plate-shaped, or indefinite-shape structure formed by self-assembly of the amphiphilic molecules.

In the pressure-sensitive adhesive composition, the amphiphilic molecule particles preferably have an average major-axis length of 2 µm or less.

In the pressure-sensitive adhesive composition, the amphiphilic molecule particles preferably have dimensions along XYZ coordinate axes perpendicular to one another, and when the particles have a major axis along the X-axis, the particles have dimensions of 400 nm or less along at least two of the coordinate axes.

The pressure-sensitive adhesive composition preferably includes 0.01 to 10 parts by weight of the amphiphilic molecule particles based on 100 parts by weight of the base polymer.

In the pressure-sensitive adhesive composition, the base polymer is preferably a (meth)acrylic-based polymer.

The pressure-sensitive adhesive composition preferably further includes a crosslinking agent.

The invention also relates to a pressure-sensitive adhesive layer, characteristic in that, which made from the above pressure-sensitive adhesive composition.

The pressure-sensitive adhesive layer preferably has a total light transmittance of 88% or more and a haze of 3% or less, when applied with a thickness of 25 µm to a transparent glass plate and measured in a dry state.

The invention also relates to a pressure-sensitive adhesive member, including:
a support base material; and
the above pressure-sensitive adhesive layer provided on one or both sides of the support base material.

In the pressure-sensitive adhesive member, when the pressure-sensitive adhesive layer is attached to a glass substrate, the adhesive strength (A) of the pressure-sensitive adhesive layer is preferably reduced to an adhesive strength (B) which is ½ or less of the adhesive strength (A) by an impression of heating the pressure-sensitive adhesive layer at 100° C. or more for 1 minute or more or of immersing the pressure-sensitive adhesive layer in hot water at 80° C. or more for 1 minute or more.

As the above pressure-sensitive adhesive member, a pressure-sensitive adhesive optical film using an optical film as the support base material is preferable.

The invention also relates to an image display, including at least one piece of a pressure-sensitive adhesive optical film as the above pressure-sensitive adhesive member. The preferably useful embodiment is that the pressure-sensitive adhesive layer of the pressure-sensitive adhesive member is directly attached to a glass substrate.

The invention also relates to an image display, including:
an optical film;
a display panel; and
the above pressure-sensitive adhesive layer with which the optical film and the display panel are attached together.

The invention further relates to a method for peeling off an optical film from an image display, including: subjecting the image display to an impression of heating at 100° C. or more for 1 minute or more or of immersion in hot water at 80° C. or more for 1 minute or more so that the pressure-sensitive adhesive layer can have a reduced adhesive strength; and then peeling off the optical film from the display panel. And the invention further relates to a method for removing a display panel from an image display, including: subjecting to reducing the adhesive strength of the pressure-sensitive adhesive layer; and then peeling off the optical film from the display panel to remove the display panel. In these methods, the adhesive strength of the pressure-sensitive adhesive layer after the impression is preferably reduced to ½ or less of the adhesive strength of the pressure-sensitive adhesive layer before the impression because of the impression.

Effects of the Invention

In the pressure-sensitive adhesive composition of the invention, the amphiphilic molecule particles, which are added in a certain amount to the base polymer, have almost no effect on the adhesive characteristics of the base polymer. Therefore, the pressure-sensitive adhesive layer made from the pressure-sensitive adhesive composition of the invention can maintain stable adhesive characteristics as long as possible under normal use conditions.

On the other hand, the adhesive strength of the pressure-sensitive adhesive layer of the invention can be reduced by applying impression previously designed to the amphiphilic molecule particles. Such impression may be applied to the pressure-sensitive adhesive layer at the time of reworking, at the time of disposal when the life of a product such as an image display is ended, or at the time of recycling, so that the adhesive strength can be reduced in a desired manner depending on how the pressure-sensitive adhesive member is to be used, which makes it possible to peel off the pressure-sensitive adhesive member from the adherend by a simple and quick process. It is considered that the adhesive strength of the pressure-sensitive adhesive layer can be reduced through the following process. In the amphiphilic molecule particles, the bonding structure of an aggregate of the molecules is collapsed by the impression of the previously designed conditions, so that the amphiphilic molecules disperse and move in the pressure-sensitive adhesive to gather at the interface of the adherend such as a glass substrate or at the interface with the optical film, which causes a reduction in the adhesive strength of the pressure-sensitive adhesive layer.

The adhesive strength of the pressure-sensitive adhesive layer according to the invention is reduced based on the collapse of the amphiphilic molecule particles. Therefore, the adhesive strength of the pressure-sensitive adhesive layer can be reduced safely and harmlessly without generation of odor or greenhouse gases. Specifically, when the adhesive strength of the pressure-sensitive adhesive layer according to the invention is reduced, the pressure-sensitive adhesive is not dissolved by a solvent, and the reduction can be achieved by the addition of a small amount of amphiphilic molecule particles, for which biologically harmless materials are often used, and therefore, the reduction is very environmentally-friendly.

The pressure-sensitive adhesive composition of the invention is suitable for use in forming pressure-sensitive adhesive layers for various pressure-sensitive adhesive members. In particular, the pressure-sensitive adhesive member is useful in the field of pressure-sensitive adhesive optical films produced using an optical film as a support base material, and the glass substrate of a liquid crystal cell reduced in thickness (particularly 1 mm or less in thickness) is preferably used as the adherend for the pressure-sensitive adhesive member.

The image display has an optical film and a display panel attached together with the pressure-sensitive adhesive layer made from the pressure-sensitive adhesive composition of the invention. For example, therefore, even when the surface of the display panel is made of a thin glass material, the optical film or the display panel can be peeled off or removed from the image display without breakage of the thin glass material. Thus, the pressure-sensitive adhesive layer made from the pressure-sensitive adhesive composition of the invention is very effective in recycling display panels.

The method of the invention for peeling off or removing the optical film or the display panel from the image display is based on a reduction in the adhesive strength at the interface between the pressure-sensitive adhesive and the adherend or the optical film, and the peeling condition is heating or immersion in hot water, which is safer than in conventional methods and very environmentally-friendly.

Patent Document 3 lists particles to be dispersed, which include fine particles of organic polymer compounds such as acrylic resin, polyurethane resin and polyamide resin, and fine particles of inorganic compounds such as silica. The fine particles described in Patent Document 3 are not amphiphilic molecule particles for use in the invention and therefore do not produce the molecular dissociation action or the particle disintegration action as described above. The stability is rather higher when the fine particles described in Patent Document 3, specifically silica fine particles are used than when a pressure-sensitive adhesive is used alone. Therefore, the control of the adhesive strength as disclosed herein is not possible with the fine particles described in Patent Document 3, and the objects of the invention cannot be achieved with the fine particles described in Patent Document 3.

EMBODIMENTS FOR CARRYING OUT THE INVENTION

The pressure-sensitive adhesive composition of the invention contains a base polymer and amphiphilic molecule particles that have an aggregate structure of amphiphilic molecules having hydrophilic group and hydrophobic group in the same molecule.

The pressure-sensitive adhesive may be of any type, such as a rubber pressure-sensitive adhesive, an acrylic pressure-sensitive adhesive, a silicone pressure-sensitive adhesive, a urethane pressure-sensitive adhesive, a vinyl alkyl ether pressure-sensitive adhesive, a polyvinyl alcohol pressure-sensitive adhesive, a polyvinylpyrrolidone pressure-sensitive adhesive, a polyacrylamide pressure-sensitive adhesive, or a cellulose pressure-sensitive adhesive. The pressure-sensitive adhesive base polymer may be selected depending on the type of the pressure-sensitive adhesive.

Among the above pressure-sensitive adhesives, an acrylic pressure-sensitive adhesive is preferably used, because it has a high level of optical transparency and weather resistance or heat resistance and exhibits appropriate wettability and pressure-sensitive adhesive characteristics such as appropriate cohesiveness and adhesiveness.

Acrylic pressure-sensitive adhesives contain, as a base polymer, a (meth)acrylic-based polymer having a main skeleton of an alkyl(meth)acrylate monomer unit. As used herein, the term "alkyl(meth)acrylate" refers to alkyl acrylate and/or alkyl methacrylate, and "(meth)" has the same meaning with respect to the invention. The alkyl(meth)acrylate that forms the main skeleton of the (meth)acrylic-based polymer may have a straight or branched chain alkyl group having 1 to 18 carbon atoms. For example, the alkyl group may be methyl, ethyl, propyl, isopropyl, butyl, isobutyl, amyl, hexyl, cyclohexyl, heptyl, 2-ethylhexyl, isooctyl, nonyl, decyl, isodecyl, dodecyl, isomyristyl, lauryl, tridecyl, pentadecyl, hexadecyl, heptadecyl, octadecyl, or the like. These may be used alone or in any combination. The alkyl groups preferably have an average carbon number of 3 to 9.

An aromatic ring-containing alkyl(meth)acrylate ester such as phenoxyethyl(meth)acrylate may also be used. A polymer of such an aromatic ring-containing alkyl(meth)acrylate ester may be used in a mixture with any of the exemplary (meth)acrylic-based polymers. In view of transparency, however, such an aromatic ring-containing alkyl(meth)acrylate ester is preferably used to form a copolymer with the alkyl(meth)acrylate ester.

In order to improve adhesiveness or heat resistance, one or more copolymerizable monomers having an unsaturated double bond-containing polymerizable functional group such as a (meth)acryloyl group or a vinyl group may be introduced into the (meth)acrylic-based polymer by copolymerization. Examples of copolymerizable monomers include hydroxyl group-containing monomers such as 2-hydroxyethyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and (4-hydroxymethylcyclohexyl)-methyl acrylate; carboxyl group-containing monomers such as include (meth)acrylic acid, carboxyethyl(meth)acrylate, carboxypentyl(meth)acrylate, itaconic acid, maleic acid, fumaric acid, and crotonic acid; acid anhydride group-containing monomers such as maleic anhydride and itaconic anhydride; caprolactone addition products of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid; and phosphate group-containing monomers such as 2-hydroxyethylacryloyl phosphate.

And monomers for modification exemplified (N-substituted) amide monomers such as (meth)acrylamide, N,N-dimethyl(meth)acrylamide, N-butyl(meth)acrylamide, N-methylol(meth)acrylamide, and N-methylolpropane (meth)acrylamide; alkylaminoalkyl(meth)acrylate monomers such as aminoethyl(meth)acrylate, N,N-dimethylaminoethyl(meth)acrylate, and tert-butylaminoethyl(meth)acrylate; alkoxyalkyl(meth)acrylate monomers such as methoxyethyl(meth)acrylate and ethoxyethyl(meth)acrylate; and succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine; maleimide monomers such as N-cyclohexylmaleimide, N-isopropylmaleimide, N-laurylmaleimide, and N-phenylmaleimide; and itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide.

It is also possible to use monomers for modification, vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl (meth)acrylate; glycol acrylate monomers such as polyethylene glycol(meth)acrylate, polypropylene glycol(meth)acrylate, methoxyethylene glycol(meth)acrylate, and methoxypolypropylene glycol(meth)acrylate; and acrylate ester monomers such as tetrahydrofurfuryl(meth)acrylate, fluoro(meth)acrylate, silicone(meth)acrylate, and 2-methoxyethyl acrylate. Examples also include isoprene, butadiene, isobutylene, vinyl ether, and so on.

Examples of copolymerizable monomers that may be used also include polyfunctional monomers having two or more unsaturated double bonds of (meth)acryloyl groups, vinyl groups or the like, such as (meth)acrylic acid esters of polyhydric alcohols, such as tripropylene glycol di(meth)acrylate, tetraethylene glycol di(meth)acrylate, 1,6-hexanediol di(meth)acrylate, bisphenol A diglycidyl ether di(meth)acrylate, neopentyl glycol di(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, and caprolactone modified dipentaerythritol hexa(meth)acrylate; and polyester(meth)acrylates, epoxy (meth)acrylates or urethane(meth)acrylates having a polyester, epoxy or urethane skeleton and two or more unsaturated double bonds of (meth)acryloyl groups, vinyl groups or the like added as functional groups to the skeleton similarly to the case of the monomer components.

Concerning the weight ratios of all monomer components, the alkyl(meth)acrylate ester may be a main component of the (meth)acrylic-based polymer, and the content of the copolymerizable monomer to form the (meth)acrylic-based polymer is preferably, but not limited to, 0 to about 20%, more preferably about 0.1 to about 15%, even more preferably about 0.1 to about 10%, based on the total weight of all monomer components.

Among these copolymerizable monomers, a hydroxyl group-containing monomer or a carboxylic group-containing monomer is preferably used in view of adhesiveness or durability. When the pressure-sensitive adhesive composition contains a crosslinking agent, these copolymerizable monomers can serve as a reactive site with the crosslinking agent. The hydroxyl group-containing monomer, the carboxyl group-containing monomer or the like is highly reactive with intermolecular crosslinking agents and therefore is preferably used to improve the cohesiveness or heat resistance of the resulting pressure-sensitive adhesive layer.

When the hydroxyl group-containing monomer and the carboxyl group-containing monomer are each added as the copolymerizable monomer, the content of the copolymerizable monomer used may be as described above, and the contents of the carboxyl group-containing monomer and the hydroxyl group-containing monomer are preferably from 0.1 to 10% by weight and from 0.01 to 2% by weight, respectively. The content of the carboxyl group-containing monomer is more preferably from 0.2 to 8% by weight, even more preferably from 0.6 to 6% by weight. The content of the hydroxyl group-containing monomer is more preferably from 0.03 to 1.5% by weight, even more preferably from 0.05 to 1% by weight.

In the invention, the (meth)acrylic-based polymer used may have a weight average molecular weight in the range of 1,000,000 to 3,000,000. In view of durability, particularly in view of heat resistance, the (meth)acrylic-based polymer used preferably has a weight average molecular weight of 1,500,000 to 2,500,000, more preferably 1,700,000 to 2,500,000, even more preferably 1,800,000 to 2,500,000. A weight average molecular weight of less than 1,500,000 is not preferred in view of heat resistance. A weight average molecular weight of more than 3,000,000 is also not preferred, because such a weight average molecular weight may cause a reduction in attaching ability or adhesive strength. The weight average molecular weight may refer to a polystyrene-equivalent weight average molecular weight as measured and calculated by GPC (gel permeation chromatography).

The method for producing such a (meth)acrylic-based polymer may be appropriately selected from known production methods such as solution polymerization, bulk polymerization, emulsion polymerization, and various types of radical polymerization. The resulting (meth)acrylic-based polymer may be any of a random copolymer, a block copolymer and a graft copolymer.

In solution polymerization, for example, ethyl acetate, toluene or the like may be used as a polymerization solvent. An example of solution polymerization includes performing the reaction under a stream of inert gas such as nitrogen in the presence of a polymerization initiator typically under the reaction conditions of a temperature of about 50 to about 70° C. and a time period of about 5 to about 30 hours.

Any appropriately selected polymerization initiator, chain transfer agent, emulsifying agent, or the like may be used for radical polymerization. The weight average molecular weight of the (meth)acrylic-based polymer may be controlled by the amount of the addition of the polymerization initiator or the chain transfer agent or by the reaction conditions. The amount of the addition may be adjusted as appropriate depending on the type of these materials.

The amphiphilic molecule particles contained in the pressure-sensitive adhesive composition of the invention each have an aggregate structure of amphiphilic molecules. Amphiphilic molecules have both a water-soluble part (hydrophilic part) and a hardly water-soluble part (hydrophobic part) in the same molecule (such as surface active agents).

The amphiphilic molecule added to and used in the pressure-sensitive adhesive composition of the invention forms a particle structure in the pressure-sensitive adhesive. Such an amphiphilic molecule capable of forming particles in the pressure-sensitive adhesive is preferably solid at least at room temperature and normal pressure. Specifically, when the amphiphilic molecules are strongly bound together under normal circumstances, optical films can be well attached without peeling under normal circumstances. On the other hand, when certain impression conditions are applied, the amphiphilic molecule particles can dissociate and move to the interface between the pressure-sensitive adhesive layer and the adherend or between the pressure-sensitive adhesive layer and the optical film to reduce the adhesive strength of the pressure-sensitive adhesive layer. Thus, it is an important feature of the invention that the amphiphilic molecule particles can dissociate under certain impression conditions. Therefore, the adhesive strength of the pressure-sensitive adhesive layer according to the invention can irreversibly change.

In the amphiphilic molecule particles, the dissociation energy increases as the intermolecular bonding strength increases. As described above, when an image display having an optical film and a display panel attached together with the pressure-sensitive adhesive layer according to the invention is exposed to certain peeling conditions different from normal use conditions, the adhesive strength of the pressure-sensitive adhesive layer is reduced by the effect of the amphiphilic molecule. On the other hand, when the amphiphilic molecule is liquid at room temperature and normal pressure, the intermolecular bonding strength is smaller than that in the solid case, and the molecule itself can freely move, so that even under normal conditions, the molecule can slowly move in the pressure-sensitive adhesive of the image display and tend to reduce the adhesive strength of the pressure-sensitive adhesive layer. It will be understood that under normal use conditions, the optical film needs to be tightly attached. Therefore, it is preferred that at least under normal conditions for the operation of image displays, the amphiphilic molecules should not dissociate or move in the pressure-sensitive adhesive and therefore should be solid at room temperature and normal pressure. In the invention, therefore, to satisfy the properties described above, amphiphilic molecules that are solid at room temperature and normal pressure are preferably dispersed in the form of particles in the pressure-sensitive adhesive. In order to peel off the optical film from the adherend such as a display panel, certain impression conditions are applied for the dissociation of the amphiphilic molecule particles. Concerning such impression conditions for the dissociation, a higher temperature is necessary as the bonding strength between the amphiphilic molecules increases, and in general, when the molecule has a higher melting point, a higher temperature needs to be applied.

To peel off the optical film from the image display, it is also preferred that the dissociating amphiphilic molecules move to the interface between the pressure-sensitive adhesive layer and the adherend such as a display panel or between the pressure-sensitive adhesive layer and the optical film. Therefore, the amphiphilic molecules preferably have relatively high mobility among the pressure-sensitive adhesive molecules, and in general, the optical film can be more easily peeled off under higher temperature conditions. In addition, in the presence of many water molecules, peeling is possible at relatively low temperature, because the base polymer of the pressure-sensitive adhesive is hydrophobic.

The amphiphilic molecule may typically be classified into an ionic type and a nonionic type, and the ionic type may be classified into a negative ion type (anionic type), a positive ion type (cationic type) and an amphoteric type. For example, the hydrophobic part of the amphiphilic molecule may be a hydrocarbon group. The hydrocarbon group preferably has a hydrocarbon chain of about 6 to about 50 carbon atoms. The hydrocarbon chain is preferably a straight chain. The hydrocarbon chain may be saturated or unsaturated. When it is unsaturated, it preferably has three or less double bonds.

Examples of the hydrophilic part of the amphiphilic molecule include, but not limited to, polyhydric alcohol, a carboxyl group, a sulfone group, an amino group, a phosphoric acid group, a sulfate ester group, and a phosphate ester group.

In the amphiphilic molecule generally used, the hydrophilic and hydrophobic parts may be attached directly or through an ester bond, an ether bond, an amide bond, an arylene group, or an aryleneoxy group.

The amphiphilic molecule is preferably a compound having a polyhydric alcohol moiety or a phosphoric acid group as a hydrophilic group and a saturated or unsaturated hydrocarbon chain as a hydrophobic group.

Examples of the amphiphilic molecule include fatty acids, straight-chain alkylbenzenes, higher alcohols, alkylphenols, α-olefins, normal paraffins, alkylglucosides, sucrose fatty acid esters, sorbitan fatty acid esters, and polyoxyethylene sorbitan fatty acid esters. In particular, higher alcohols are preferably polyoxyethylene alkyl ethers. For example, such polyoxyethylene alkyl ethers may be represented by general formula (1): $C_mH_{2m+1}$—O—$(CH_2$—$CH_2$—$O)_n$—H, wherein m is the number of carbon atoms in the alkyl group, and n is the mole number of added ethylene oxide. In generally, m is in the range of 10 to 20, preferably in the range of 12 to 15.

Also preferably used are sorbitan monopalmitate, sorbitan monostearate, sorbitan tristearate, polyoxyethylene sorbitan monostearate, polyoxyethylene sorbitan tristearate, polyoxyethylene cetyl ether, and so on.

Examples of the sucrose fatty acid ester amphiphilic molecule include those disclosed in JP-A No. 2004-256414. Specific examples thereof include N-glycoside type glycolipids represented by general formula (2): G-NHCO—R, wherein G represents a sugar residue obtained by removing a hemiacetal hydroxyl group attached to an anomeric carbon from a sugar, and R represents an unsaturated hydrocarbon group of 10 to 39 carbon atoms (see JP-A No. 2004-224717); asymmetric two-headed lipids (bolalipids) represented by general formula (3): R'—NHCO—$(CH_2)_n$—COOH, wherein R' represents a residue obtained by removing a reducing terminal hydroxyl group from an aldopyranose, and n represents a number of 6 to 20 (see JP-A No. 2002-322190); O-glycoside type glycolipids having a structure represented by general formula (4): G'-O—Ph-R", wherein G' represents a sugar residue, Ph represents a phenyl group, and R" represents a hydrocarbon group of 6 to 25 carbon atoms (see JP-A No. 2002-80489 and Japanese Patent Application No. 2002-61797); and a compound composed of a transition metal and a peptide lipid represented by general formula (5): R'''CO(NHCH$_2$CO)$_m$OH, wherein R''' represents a hydrocarbon group of 6 to 18 carbon atoms, and m represents an integer of 1 to 3 (see Japanese Patent Application No. 2003-039276).

The amphiphilic molecule particles may have any size and any shape. For optical applications, the amphiphilic molecule particles are preferably optically-transparent and preferably have an average major axis length of, for example, 2 μm or less, more preferably 1 μm or less, even more preferably 0.5 μm or less. In terms of making high-definition image displays, mixing of large particles should be avoided, and it is not preferred to add particles with a major axis length of 10 μm or more. On the other hand, the particles preferably have a short minor axis length. The minor and major axis lengths of the particles do not have a particular lower limit. At least to make the feature of the invention significant, the amphiphilic molecules need to be sufficiently bound together (aggregated). Therefore, the average minor or major axis length is preferably 0.005 μm or more, more preferably 0.01 μm or more, even more preferably 0.02 μm or more so that forces acting between the molecules can be sufficiently effective.

The amphiphilic molecule particles have an aggregate structure of amphiphilic molecules. The amphiphilic molecule particles may have any shape such as sphere, rod, or indefinite shape. The particle shape is less relevant to the control of the adhesive strength, an object of the invention, and therefore may be freely selected. On the other hand, the aggregate structure is preferably an amphiphilic molecule crystal in which the amphiphilic molecules are aligned. The amphiphilic molecule crystal preferably forms a structure with the hydrophilic parts and the hydrophobic parts of the amphiphilic molecules aligned by self-assembly, respectively.

The amphiphilic molecule crystal is a material in such a state that the hydrophobic parts and the hydrophilic parts of the amphiphilic molecules are arranged with a certain degree of regularity, respectively. As long as the crystal has a state in which the molecules are arranged with a certain degree of regularity, each molecule does not need to stop moving, or the crystal does not need to have a definite crystal lattice. For example, the amphiphilic molecule crystal may have a spherical, hollow spherical, hollow fibrous, plate-shaped, or indefinite shape structure formed by self-assembly of the amphiphilic molecules.

As described above, in the amphiphilic molecule particles, the dissociation energy increases as the intermolecular bonding strength increases. Therefore, the amphiphilic molecule crystal is preferred, because it is generally more stable at room temperature and high temperature than a normal solid of the amphiphilic molecules.

The amphiphilic molecule crystal may have dimensions along XYZ coordinate axes perpendicular to one another, and when the particles have a major axis along the X-axis, the particles preferably have dimensions of 400 nm or less along at least two of the coordinate axes, so that light scattering can be reduced. The dimensions along at least two of the coordinate axes are preferably from 5 to 300 nm, more preferably from 10 to 200 nm. The dimensions along at least two of the coordinate axes may be the same or different. When the dimensions along at least two of the coordinate axes are 400 nm or less, particularly 200 nm or less, the dimension along the remaining one coordinate axis is preferably 3 μm or less, more preferably 1 μm or less, even more preferably from 5 to 400 nm.

The amphiphilic molecule crystal having a hollow fiber structure may be so-called a hollow fibrous organic nanotube. The N-glycoside type glycolipid represented by general formula (2) is preferably used as the amphiphilic molecule to form such a hollow fibrous organic nanotube.

For example, such a hollow fibrous organic nanotube may be produced by the method described in JP-A No. 2004-224717.

Such a hollow fibrous organic nanotube may also be produced by the method described in JP-A No. 2004-256414.

Hollow fibrous organic nanotubes may have an average outer diameter of 70 to 400 nm, preferably 100 to 300 nm, an average inner diameter (an average hollow diameter) of 40 to 300 nm, preferably 50 to 200 nm, and a length of several hundred nm to several hundred μm. The form of hollow fibrous organic nanotubes can easily be observed using a standard optical microscope. The tube structure can be observed in more detail using a laser microscope, an atomic force microscope or an electron microscope.

The amount of the addition of the amphiphilic molecule particles is preferably adjusted to an optimal amount as described below in terms of controlling the adhesive strength of the pressure-sensitive adhesive layer as described above and in view of optical properties and so on, while its upper limit is not particularly restricted. The pressure-sensitive adhesive composition of the invention preferably contains 0.01 to 10 parts by weight of the amphiphilic molecule particles (on a solids basis), based on 100 parts by weight of the base polymer (on a solids basis). If the content of the amphiphilic molecule particles is too low, the composition will become closer to transparent, but it may be difficult to reduce the adhesive strength in a desired manner, which is not preferred to achieve an object of the invention, namely, a significant reduction in adhesive strength by the impression of peeling conditions. On the other hand, if the content of the amphiphilic molecule particles is too high, the pressure-sensitive adhesive composition may have an increased turbidity and tend to be unsuitable for optical film bonding applications. If the particle content is too high, a region containing unevenly distributed particles may also easily occur in the pressure-sensitive adhesive composition, which may cause uneven display and affect the pressure-sensitive adhesive characteristics. If the amount of the addition of the amphiphilic molecule particles is too large, the initial adhesive strength may be reduced, so that the function of fixing an optical film may be lost under normal circumstances. Based on 100 parts by weight of the base polymer, the content of the amphiphilic molecule particles is preferably from 0.1 to 6 parts by weight, more preferably from 0.03 to 5 parts by weight.

The amphiphilic molecule particles may be added to the base polymer by a conventional method. In a non-limiting example, the pressure-sensitive adhesive composition may be produced by a process that includes grinding a solid amphiphile into a predetermined size, adding the ground amphiphile to a base polymer previously prepared and so on, and mixing them by stirring to form amphiphilic molecule particles in a pressure-sensitive adhesive composition. Another method for producing the pressure-sensitive adhesive composition of the invention includes adding a solution of an amphiphilic molecule in a good solvent directly to a base polymer and so on to form amphiphilic molecule particles in a pressure-sensitive adhesive composition. This method is preferably used when the amphiphilic molecule has a low affinity for the pressure-sensitive adhesive (the base polymer and so on). In this case, the good solvent for the amphiphilic molecule is conveniently soluble in the pressure-sensitive adhesive or the solvent in which the adhesive is dissolved, so that a uniform mixture can be formed. As the good solvent is added to the pressure-sensitive adhesive or the solvent for the pressure-sensitive adhesive, the amphiphilic molecules condense to form particles as described above, so that the pressure-sensitive adhesive of the invention can be obtained.

Alternatively, a solution of the amphiphilic molecules in a good solvent may be added to a poor solvent and stirred, so that amphiphilic molecule particles or a dispersion thereof can be obtained. The product may be dispersed in the base polymer and so on, so that the pressure-sensitive adhesive composition of the invention can be obtained. In this case, the poor solvent for the amphiphilic molecule is preferably a good solvent for the pressure-sensitive adhesive composition. If necessary, the amphiphilic molecule particles obtained by this process may be subjected to a further process such as classification, filtration, or purification, before they are added to the base polymer and so on. The further process makes it possible to use particles of the desired size and/or shape.

The pressure-sensitive adhesive composition preferably contains a crosslinking agent. Examples of the crosslinking agents include organic crosslinking agents and multifunctional metal chelates. Examples of organic crosslinking agents include epoxy crosslinking agents, isocyanate crosslinking agents, imine crosslinking agents, and peroxide crosslinking agents. These crosslinking agents are used alone or a combination two or more. The organic crosslinking agent is preferably an isocyanate crosslinking agent. The multifunctional metal chelate may comprise a multivalent metal and an organic compound that are covalently or coordinately bonded to one another. Examples of the multivalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

The amount of the crosslinking agent added to the base polymer is generally, but not limited to, about 10 parts by weight or less (on a solids base) based on 100 parts by weight of the base polymer (on a solids base). The amount of the crosslinking agent is preferably from 0.001 to 10 parts by weight, more preferably from about 0.01 to about 5 parts by weight.

If necessary, the pressure-sensitive adhesive composition may conveniently contain various types of additives such as tackifiers, plasticizers, fillers such as glass fibers, glass beads, metal power, or any other inorganic powder, pigments, colorants, antioxidants, ultraviolet absorbers, and silane coupling agents, without departing from the object of the invention. The pressure-sensitive adhesive layer may also contain fine particles so as to have light diffusion properties.

The additive is preferably a silane coupling agent, and preferably about 0.001 to about 10 parts by weight, more preferably about 0.005 to about 5 parts by weight of a silane coupling agent (on a solids base) is added based on 100 parts by weight of the base polymer (on a solids base). Any known conventional silane coupling agent may be used without particular limitations. Examples of silane coupling agents include epoxy group-containing silane coupling agents such as γ-glycidoxypropyltrimethoxysilane, γ-glycidoxypropyltriethoxysilane, γ-glycidoxypropylmethyldiethoxysilane, and 2-(3,4-epoxycyclohexyl)ethyltrimethoxysilane; amino group-containing silane coupling agents such as 3-aminopropyltrimethoxysilane, N-2-(aminoethyl)-3-aminopropylmethyldimethoxysilane, and 3-triethoxysilyl-N-(1,3-dimethylbutylidene)propylamine; (meth)acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane.

The adhesive strength of the pressure-sensitive adhesive layer made from the pressure-sensitive adhesive composition is preferably controlled in such a manner that the adhesive strength (A) of the pressure-sensitive adhesive layer attached to a glass substrate can be reduced to an adhesive strength (B) which is half (½) or less of the adhesive strength (A) by impression of heating the pressure-sensitive adhesive layer at 100° C. or more for 1 minute or more or of immersing the pressure-sensitive adhesive layer in hot water at 80° C. or more for 1 minute or more. The adhesive strength (A) before the impression and adhesive strength (B) after the impression may be measured by the method described in the section "EXAMPLES."

The pressure-sensitive adhesive member of the invention is obtained by forming a pressure-sensitive adhesive layer from the pressure-sensitive adhesive composition on one or both sides of a support base material. Various materials may be used as the support base material, examples of which include an optical film and a separator.

When the support base material is a separator, the pressure-sensitive adhesive member may typically be obtained by a process that includes applying the pressure-sensitive adhesive composition to the separator and removing the solvent and so on by drying to form a pressure-sensitive adhesive layer. When the support base material is an optical film, the pressure-sensitive adhesive member may be prepared by a method including transferring, to the optical film, the pressure-sensitive adhesive layer formed on the separator or a method including applying the pressure-sensitive adhesive composition to the optical film and removing the solvent and so on by drying to form a pressure-sensitive adhesive layer directly on the optical film. In the process of applying the pressure-sensitive adhesive, if necessary, one or more additional solvents other than the polymerization solvent may be added.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The thickness of the pressure-sensitive adhesive layer is typically, but not limited to, from about 1 to about 100 µm, preferably from 5 to 50 µm, more preferably from 10 to 30 µm.

The pressure-sensitive adhesive layer of the invention is also preferably transparent as described above. The pressure-sensitive adhesive layer of the invention preferably has a high total light transmittance and a low turbidity (haze), because it is generally used for bonding between an optical film and a display panel. More specifically, the total light transmittance of the pressure-sensitive adhesive layer with a thickness of 25 µm applied to a transparent glass plate is preferably 88% or more, more preferably 90% or more, even more preferably 92% or more, when measured under dry conditions. Under the same conditions, the haze of the pressure-sensitive adhesive layer is preferably 3% or less, more preferably 2% or less, even more preferably 1% or less.

Examples of the material used to form the separator include a plastic film such as a polyethylene, polypropylene, polyethylene terephthalate, or polyester film, a porous material such as paper, fabric, or nonwoven fabric, and an appropriate thin material such as a net, a foamed sheet, a metal foil, and a laminate thereof. A plastic film is preferably used, because of its good surface smoothness.

Any plastic film capable of protecting the pressure-sensitive adhesive layer may be used, examples of which include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 µm, preferably from about 5 to about 100 µm. If necessary, the separator may be subjected to a release treatment and an antifouling treatment with a silicone, fluoride, long-chain alkyl, or fatty acid amide release agent, silica powder or the like, or subjected to an antistatic treatment of coating type, kneading and mixing type, vapor-deposition type, or the like. In particular, when the surface of the separator is appropriately subjected to a release treatment such as a silicone treatment, a long-chain alkyl treatment, or a fluorine treatment, the releasability from the pressure-sensitive adhesive layer can be further increased.

The pressure-sensitive adhesive layer may be exposed. In such a case, the pressure-sensitive adhesive layer may be protected by the separator until it is actually used. The release-treated sheet used in the preparation of the pressure-sensitive adhesive member may be used as is as a separator for a pressure-sensitive adhesive optical film, so that the process can be simplified.

When the support base material is an optical film, the surface of the optical film may also be coated with an anchor layer or subjected to any adhesion-facilitating treatment such as a corona treatment or a plasma treatment so as to have improved adhesion to a pressure-sensitive adhesive layer, and then the pressure-sensitive adhesive layer may be formed. The surface of the pressure-sensitive adhesive layer may also be subjected to an adhesion-facilitating treatment.

Materials that may be used to form the anchor layer preferably include an anchoring agent selected from polyurethane, polyester, and polymers containing an amino group in the molecule, in particular, preferably polymers containing an amino group in the molecule. Polymers containing an amino group in the molecule allow the amino group in the molecule to react with a carboxyl group or the like in the pressure-sensitive adhesive or to make an interaction such as an ionic interaction, so that good adhesion can be ensured.

Examples of polymers containing an amino group in the molecule include polyethyleneimine, polyallylamine, polyvinylamine, polyvinylpyridine, polyvinylpyrrolidine, and a polymer of an amino group-containing monomer such as dimethylaminoethyl acrylate.

The optical film is, but not limited to the kinds, used for forming image display such as liquid crystal display. A polarizing plate is exemplified. A polarizing plate including a polarizer and a transparent protective film provided on one side or both sides of the polarizer is generally used.

A polarizer is, but not limited to, various kinds of polarizer may be used. As a polarizer, for example, a film that is uniaxially stretched after having dichromatic substances, such as iodine and dichromatic dye, absorbed to hydrophilic polymer films, such as polyvinyl alcohol-based film, partially formalized polyvinyl alcohol-based film, and ethylene-vinyl acetate copolymer-based partially saponified film; polyene-based alignment films, such as dehydrated polyvinyl alcohol and dehydrochlorinated polyvinyl chloride, etc. may be mentioned. In these, a polyvinyl alcohol-based film on which dichromatic materials such as iodine, is absorbed and aligned after stretched is suitably used. Thickness of polarizer is, but not limited to, generally about 5 to about 80 µm.

A polarizer that is uniaxially stretched after a polyvinyl alcohol-based film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol-based film may be dipped in water and rinsed if needed. By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

An optical film of the invention may be exemplified as other optical layers, such as a reflective plate, a transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

Although an optical film with the above described optical layer laminated to the polarizing plate may be formed by a method in which laminating is separately carried out sequentially in manufacturing process of a liquid crystal display or the like, an optical film in a form of being laminated beforehand has an outstanding advantage that it has excellent stability in quality and assembly workability, and thus manufacturing processes ability of a liquid crystal display or the like may be raised. Proper adhesion means, such as a pressure-sensitive adhesive layer, may be used for laminating. On the occasion of adhesion of the above described polarizing plate and other optical films, the optical axis may be set as a suitable configuration angle according to the target retardation characteristics or the like.

The pressure-sensitive adhesive optical film of the invention is preferably used to form various types of image displays such as liquid crystal displays. Liquid crystal displays may be produced according to conventional techniques. Specifically, liquid crystal displays are generally produced by appropriately assembling a display panel such as a liquid crystal cell and the pressure-sensitive adhesive optical film and optionally other components such as a lighting system and incorporating a driving circuit according to any conventional technique, except that the pressure-sensitive adhesive optical film of the invention is used. Any type of liquid crystal cell may also be used such as a TN type, an STN type, a π type, a VA type and an IPS type.

Suitable liquid crystal displays, such as liquid crystal display with which the above pressure-sensitive adhesive optical film has been provided on one side or both sides of the display panel such as a liquid crystal cell, and with which a backlight or a reflective plate is used for a lighting system may be manufactured. In this case, the pressure-sensitive adhesive optical film may be provided on one side or both sides of the display panel such as a liquid crystal cell. When providing the pressure-sensitive adhesive optical films on both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

According to the invention, certain impression conditions may be applied to the image display having the optical film and the display panel attached together with the pressure-sensitive adhesive layer as described above, so that the optical film can be easily peeled off from the display panel and that the display panel can be easily removed.

In general, the optical film is used in the form of a pressure-sensitive adhesive optical film, from which a separator placed on the surface of the pressure-sensitive adhesive layer is separated so that the optical film can be attached to the display panel using a roller or the like. Thereafter, if necessary, the optical film may be tightly attached under pressure at about 50° C. to the display panel with the pressure-sensitive adhesive layer interposed therebetween. In general, the liquid crystal display is often lit and aged at a high temperature of about 60° C. for a certain period for example 24 hours or more. In the image display being manufactured through such a process, the adhesive strength of the pressure-sensitive adhesive layer between the optical film and the display panel attached therewith gradually increases. In this case, the adhesive strength can be found to increase by 50% to 200% from that immediately after the attaching.

If a cause of a defect found in the image display after the aging process and inspection is related to the optical film, the optical film may be peeled off (reworked) so that the display panel can be reused. However, when a conventional image display is used for a long time until the end of its life, the optical film is very difficult to peel off due to an increase in the adhesive strength and degradation of the optical film, and therefore, the optical film has not been peeled off in the conventional art. In conventional reworking, a method including fixing the display panel and mechanically peeling off the optical film is dominantly performed. As described above, however, as the size of the display panel gets large or as the thickness of the glass plate used therein make thinner, the force applied to the display panel during reworking becomes greater, so that the display panel can be easily broken, which makes the peeling of the optical film very difficult. Therefore, a problem occurs in which the broken display panel is very dangerous or an abnormal cell gap is formed by a strong force applied to the panel during reworking, so that the display panel cannot be reused. There is an alternative method including cutting or scraping the pressure-sensitive adhesive with a cutter or a scraper, while peeling off the optical film. However, such a method also has a problem in which since the pressure-sensitive adhesive is resistant to cutting, it is very dangerous to cut the pressure-sensitive adhesive layer with an edged tool, and the adhesion of the pressure-sensitive adhesive to the edged tool immediately makes the cutting difficult. In this case, the film may also be torn or broken, which makes re-peeling very difficult. In addition, a method of immersing the optical film in a solvent to dissolve and remove the pressure-sensitive adhesive is substantially impossible, because the optical film has solvent resistance and swelling dissolution of the pressure-sensitive adhesive is extremely difficult.

While reworking has been performed by the mechanical method as described above, no study has been made on how to peel off optical films from old panels after the end of their life for the recycling of display panel materials.

In image displays used under a normal environment for a long time until the end of their life, optical films are very strongly attached with pressure-sensitive adhesive layers. In many cases, such optical films are degraded due to damage by light or heat over time and become more brittle than at the initial stage. In the conventional recycling of image displays after the end of their life, optical films are mechanically peeled off with display panels being held. However, as image displays have been made thinner in thickness and light weight in recent years, the thickness of glass plates used as the substrate for display panels has been gradually made thinner. Two pieces of such glass substrates are attached substantially only at their peripheral portions. Therefore, the center of the display panel substantially becomes very flexible and brittle. At the same time, the increase in the screen size of image displays continues. In general, the force applied during the peeling off increases in proportion to the size of the film to be peeled off. Therefore, the force applied to the glass plate during the peeling off of the optical film significantly increases with increasing the screen size, which makes the risk of display panel breakage greater and makes it very difficult to peel off optical films from large-screen panels.

When the method of the invention for peeling off an optical film or for removing a display panel is used, the adhesive strength can be reduced not temporarily but over a long time by placing the image display in a high-temperature environment for a relatively short time or by immersing the image display in hot water for a relatively short time, so that the optical film can be easily peeled off from the display panel, after the image display is taken out of the environment. According to this method, the amount of the elution of the amphiphilic molecules from the pressure-sensitive adhesive layer to hot water can be kept small, and relatively safe and harmless amphiphilic molecules can be used. Thus, a safe and efficient and environmentally-friendly method can be provided to peel off the optical film or to remove the display panel.

The display panel can also be easily taken out based on the process of peeling off the optical film. In particular, this method is also effective in peeling off optical films from old panels. Therefore, the separated old display panels can be easily crushed, so that indium and other rare metals can be isolated after the glass is melted, which is very effective in recycling resources.

EXAMPLES

The invention is more specifically described by the examples below, which are not intended to limit the scope of the invention. In each example, parts and % are all by weight.

Example 1

(Optical Film)
An 80 µm-thick polyvinyl alcohol-based film was stretched to 5 times in an iodine solution and then dried to give a polarizer. An optical film (polarizing plate) was prepared by bonding 80 µm-thick saponified triacetylcellulose films to both sides of the polarizer with a polyvinyl alcohol-based adhesive.

(Amphiphilic Molecule Particles)
One mg of N-(11-cis-octadecenoyl)-β-D-glucopyranosylamine (a white solid at room temperature and normal pressure) was put into a flask, and 20 mL of water was added thereto. The mixture was boiled and refluxed by heating for 30 minutes. After the aqueous solution was cooled to room temperature, 4 ml of the aqueous solution was gently poured on 3 ml of carbon tetrachloride, so that a carbon tetrachloride-water interface was formed and self-assembly occurred. The product was a milky white solid at room temperature and normal pressure. As a result of observation with an optical microscope, the product was found to be hollow fibrous organic nanotubes (amphiphilic molecule crystals) having a tubular structure with an inner diameter of 50 to 100 nm, an outer diameter of 100 to 200 nm and a length of 3 µm or less.

(Preparation of (Meth)acrylic-based Polymer)
To a reaction vessel equipped with a condenser tube, a nitrogen introducing tube, a thermometer, and a stirring device were added 100 parts of butyl acrylate, 3 parts of acrylic acid, 0.1 parts of 2-hydroxyethyl acrylate, 0.3 parts of 2,2'-azobisisobutyronitrile, and ethyl acetate to form a solution. Subsequently, while nitrogen gas was blown into the solution under stirring, the solution was allowed to react at 55° C. for 8 hours, so that a solution containing a (meth)acrylic-based polymer with a weight average molecular weight of 1,600,000 was obtained. Ethyl acetate was then added to the (meth)acrylic-based polymer containing solution so that a (meth)acrylic-based polymer solution with an adjusted solids content of 30% was obtained.

(Preparation of Pressure-Sensitive Adhesive Composition and Formation of Pressure-Sensitive Adhesive Layer)
Based on 100 parts of the solids of the (meth)acrylic-based polymer solution, 2 parts of the hollow fibrous organic nanotubes, 0.5 parts of a crosslinking agent composed mainly of an isocyanate group-containing compound (Coronate L (trade name) manufactured by NIPPON POLYURETHANE INDUSTRY CO., LTD.), and 0.2 parts of γ-glycidoxypropyltrimethoxysilane (KMB-403 (trade name) manufactured by Shin-Etsu Chemical Co., Ltd.) as a silane coupling agent were added in this order to the (meth)acrylic-based polymer solution, so that a dispersion of particles in an pressure-sensitive adhesive was obtained. The dispersion of particles in the pressure-sensitive adhesive was applied to the surface of a separator made of a release-treated polyethylene terephthalate film (38 µm in thickness) so that a 25 µm-thick coating could be formed after drying. The coating was then dried to form a pressure-sensitive adhesive layer.

(Preparation of Pressure-Sensitive Adhesive Optical Film)
The pressure-sensitive adhesive layer formed on the release-treated surface of the separator was attached to the surface of the polarizing plate, and the pressure-sensitive adhesive layer was transferred to the surface of the polarizing plate, so that a pressure-sensitive adhesive optical film (pressure-sensitive adhesive polarizing plate) was obtained.

Example 2

(Amphiphilic Molecule Particles)
Ethanol was added to hollow fibrous organic nanotubes prepared as in Example 1 ("Amphiphilic Molecule Particles"), so that a 5% ethanol solution was obtained. The solution was heated and added dropwise to toluene under high speed stirring. The solution was then condensed by removing toluene by drying, so that a precipitate was obtained. The resulting precipitate was amphiphilic molecule particles, which were solid at room temperature and normal pressure and had an indefinite shape with a diameter of about 0.5 µm to about 1.5 µm.

(Preparation of Pressure-Sensitive Adhesive Composition, Formation of Pressure-Sensitive Adhesive Layer, and Preparation of Pressure-Sensitive Adhesive Optical Film)

A dispersion of particles in a pressure-sensitive adhesive was obtained as in Example 1, except that 3 parts of the particles obtained as described above were used in place of 2 parts of the hollow fibrous organic nanotubes. The dispersion of particles in the pressure-sensitive adhesive was then applied to the surface of the separator by the same process as in Example 1 so that a 25 µm-thick coating could be formed after drying. The coating was then dried to form a pressure-sensitive adhesive layer. A pressure-sensitive adhesive optical film (pressure-sensitive adhesive polarizing plate) was prepared as in Example 1, except that the resulting pressure-sensitive adhesive layer was used instead.

Example 3

(Preparation of Pressure-Sensitive Adhesive Composition, Formation of Pressure-Sensitive Adhesive Layer, and Preparation of Pressure-Sensitive Adhesive Optical Film)

A dispersion of particles in a pressure-sensitive adhesive was obtained as in Example 1, except that the hollow fibrous organic nanotubes were added in an amount of 3 parts. The dispersion of particles in the pressure-sensitive adhesive was then applied to the surface of the separator by the same process as in Example 1 so that a 25 µm-thick coating could be formed after drying. The coating was then dried to form a pressure-sensitive adhesive layer. A pressure-sensitive adhesive optical film (pressure-sensitive adhesive polarizing plate) was prepared as in Example 1, except that the resulting pressure-sensitive adhesive layer was used instead.

Example 4

(Preparation of Pressure-Sensitive Adhesive Composition, Formation of Pressure-Sensitive Adhesive Layer, and Preparation of Pressure-Sensitive Adhesive Optical Film)

A dispersion of particles in a pressure-sensitive adhesive was obtained as in Example 1, except that the hollow fibrous organic nanotubes were added in an amount of 5 parts. The dispersion of particles in the pressure-sensitive adhesive was then applied to the surface of the separator by the same process as in Example 1 so that a 25 µm-thick coating could be formed after drying. The coating was then dried to form a pressure-sensitive adhesive layer. A pressure-sensitive adhesive optical film (pressure-sensitive adhesive polarizing plate) was prepared as in Example 1, except that the resulting pressure-sensitive adhesive layer was used instead.

Example 5

(Amphiphilic Molecule Particles)

LATEMUL PD-420 (a nonionic surfactant (a light yellow-white solid) manufactured by Kao Corporation) was dissolved in ethyl acetate. The resulting solution was then added dropwise to toluene under high speed stirring. The solution was then condensed by removing toluene by drying, so that a precipitate was obtained. The resulting precipitate was amphiphilic molecule particles, which were solid at room temperature and normal pressure and had a substantially spherical shape with a diameter of about 0.2 µm to about 2 µm.

(Preparation of Pressure-Sensitive Adhesive Composition, Formation of Pressure-Sensitive Adhesive Layer, and Preparation of Pressure-Sensitive Adhesive Optical Film)

A dispersion of particles in a pressure-sensitive adhesive was obtained as in Example 1, except that 3 parts of the particles obtained as described above were used in place of 2 parts of the hollow fibrous organic nanotubes. The dispersion of particles in the pressure-sensitive adhesive was then applied to the surface of the separator by the same process as in Example 1 so that a 25 µm-thick coating could be formed after drying. The coating was then dried to form a pressure-sensitive adhesive layer. A pressure-sensitive adhesive optical film (pressure-sensitive adhesive polarizing plate) was prepared as in Example 1, except that the resulting pressure-sensitive adhesive layer was used instead.

Example 6

(Amphiphilic Molecule Particles)

EMULGEN 210 (polyoxyethylene cetyl ether (a light yellow solid at room temperature and normal pressure) manufactured by Kao Corporation) was dissolved in ethyl acetate. The resulting solution was then added dropwise to toluene under high speed stirring. The solution was then condensed by removing toluene by drying, so that a precipitate was obtained. The resulting precipitate was amphiphilic molecule particles, which were solid at room temperature and normal pressure and had a substantially spherical shape with a diameter of about 0.2 µm to about 1.5 µm.

(Preparation of Pressure-Sensitive Adhesive Composition, Formation of Pressure-Sensitive Adhesive Layer, and Preparation of Pressure-Sensitive Adhesive Optical Film)

A dispersion of particles in a pressure-sensitive adhesive was obtained as in Example 1, except that 3 parts of the particles obtained as described above were used in place of 2 parts of the hollow fibrous organic nanotubes. The dispersion of particles in the pressure-sensitive adhesive was then applied to the surface of the separator by the same process as in Example 1 so that a 25 µm-thick coating could be formed after drying. The coating was then dried to form a pressure-sensitive adhesive layer. A pressure-sensitive adhesive optical film (pressure-sensitive adhesive polarizing plate) was prepared as in Example 1, except that the resulting pressure-sensitive adhesive layer was used instead.

Example 7

(Preparation of Pressure-Sensitive Adhesive Composition, Formation of Pressure-Sensitive Adhesive Layer, and Preparation of Pressure-Sensitive Adhesive Optical Film)

A dispersion of particles in a pressure-sensitive adhesive was obtained as in Example 1, except that the hollow fibrous organic nanotubes were added in an amount of 15 parts. The dispersion of particles in the pressure-sensitive adhesive was then applied to the surface of the separator by the same process as in Example 1 so that a 25 µm-thick coating could be formed after drying. The coating was then dried to form a pressure-sensitive adhesive layer. A pressure-sensitive adhesive optical film (pressure-sensitive adhesive polarizing plate) was prepared as in Example 1, except that the resulting pressure-sensitive adhesive layer was used instead.

Comparative Example 1

A pressure-sensitive adhesive optical film was prepared as in Example 1, except that the hollow fibrous organic nanotubes were not added in the preparation of the pressure-sensitive adhesive composition.

Comparative Example 2

(Preparation of Pressure-Sensitive Adhesive Composition, Formation of Pressure-Sensitive Adhesive Layer, and Preparation of Pressure-Sensitive Adhesive Optical Film)

A pressure-sensitive adhesive solution was obtained using the process of Example 1, except that 3 parts of BYK-333 (polyether-modified methyldisiloxane (liquid at room temperature and normal pressure) manufactured by BYK Japan KK) was added in place of 2 parts of the hollow fibrous organic nanotubes. The pressure-sensitive adhesive solution was then applied to the surface of the separator by the same process as in Example 1 so that a 25 µm-thick coating could be formed after drying. The coating was then dried to form a pressure-sensitive adhesive layer. BYK-333 particles were not observed in the pressure-sensitive adhesive layer. A pressure-sensitive adhesive optical film (pressure-sensitive adhesive polarizing plate) was prepared as in Example 1, except that the resulting pressure-sensitive adhesive layer was used instead.

Comparative Example 3

(Preparation of Pressure-Sensitive Adhesive Composition, Formation of Pressure-Sensitive Adhesive Layer, and Preparation of Pressure-Sensitive Adhesive Optical Film)

A pressure-sensitive adhesive solution was obtained using the process of Example 1, except that 3 parts of MEGAFAC F178K (perfluoroalkyl group/liophilic group-containing oligomer (liquid at room temperature and normal pressure) manufactured by DIC Corporation) was added in place of 2 parts of the hollow fibrous organic nanotubes. The pressure-sensitive adhesive solution was then applied to the surface of the separator by the same process as in Example 1 so that a 25 µm-thick coating could be formed after drying. The coating was then dried to form a pressure-sensitive adhesive layer. MEGAFAC F178K particles were not observed in the pressure-sensitive adhesive layer. A pressure-sensitive adhesive optical film (pressure-sensitive adhesive polarizing plate) was prepared as in Example 1, except that the resulting pressure-sensitive adhesive layer was used instead.

Comparative Example 4

(Preparation of Pressure-Sensitive Adhesive Composition, Formation of Pressure-Sensitive Adhesive Layer, and Preparation of Pressure-Sensitive Adhesive Optical Film)

A pressure-sensitive adhesive solution was obtained using the process of Example 1, except that 3 parts of MEGAFAC F444 (perfluoroalkyl ethylene oxide adduct (liquid at room temperature and normal pressure) manufactured by DIC Corporation) was added in place of 2 parts of the hollow fibrous organic nanotubes. The pressure-sensitive adhesive solution was then applied to the surface of the separator by the same process as in Example 1 so that a 25 µm-thick coating could be formed after drying. The coating was then dried to form a pressure-sensitive adhesive layer. MEGAFAC F444 particles were not observed in the pressure-sensitive adhesive layer. A pressure-sensitive adhesive optical film (pressure-sensitive adhesive polarizing plate) was prepared as in Example 1, except that the resulting pressure-sensitive adhesive layer was used instead.

Comparative Example 5

(Preparation of Pressure-Sensitive Adhesive Composition, Formation of Pressure-Sensitive Adhesive Layer, and Preparation of Pressure-Sensitive Adhesive Optical Film)

A pressure-sensitive adhesive solution was obtained using the process of Example 1, except that 3 parts of AQUALON HS-10 (polyoxyethylene alkyl propenyl phenyl ether sulfate ester ammonium salt (yellow-brown viscous liquid at room temperature and normal pressure) manufactured by DAI-ICHI KOGYO SEIYAKU CO., LTD.) was added in place of 2 parts of the hollow fibrous organic nanotubes. The pressure-sensitive adhesive solution was then applied to the surface of the separator by the same process as in Example 1 so that a 25 µm-thick coating could be formed after drying. The coating was then dried to form a pressure-sensitive adhesive layer. AQUALON HS-10 particles were not observed in the pressure-sensitive adhesive layer. A pressure-sensitive adhesive optical film (pressure-sensitive adhesive polarizing plate) was prepared as in Example 1, except that the resulting pressure-sensitive adhesive layer was used instead.

The pressure-sensitive adhesive optical films obtained in the examples and the comparative examples were evaluated as described below. The evaluation results are shown in Table 1.

(Adhesive Strength Test)

Each of the pressure-sensitive adhesive optical films was cut into a piece of a size of 25 mm×150 mm. The pressure-sensitive adhesive layer side of the cut piece was attached to a glass plate and then autoclaved at 50° C. and 5 atom for 15 minutes. After the glass plate laminate wasallowed to stand at 60° C. for 24 hours, the adhesive strength (A) of the film was measured as an initial adhesive strength. Subsequently, the pressure-sensitive adhesive optical film was impressed by immersion in hot water at π C. for 30 minutes, and then the adhesive strength (B) of the film was measured. The films obtained in Example 1 and Comparative Example 1 were also measured for adhesive strength (B) after impression of heating at 130° C. for 3 minutes.

<Measurement of Adhesive Strength>

A start portion of the pressure-sensitive adhesive optical film on the glass plate was chucked to Autograph Tensile Tester (manufactured by Shimadzu Corporation), and when the film was peeled off at a peel angle of 90° and a peel rate of 300 mm/minute, the peel strength (N/25 mm) was measured. The measurement was performed under an environment at a temperature of 23° C. The average of five measurements was obtained for each of the Examples, and the average of ten measurements and the average of four measurements were obtained for Comparative Example 1 and each of Comparative Examples 2 to 5, respectively.

(Peelability Test)

Each of the pressure-sensitive adhesive polarizing plates prepared as described above was cut into a piece of a size of A4 (210 mm×300 mm). The pressure-sensitive adhesive layer side of the cut piece was attached to the entire surface of a glass plate (0.7 mm in thickness). Thereafter, the cut piece was allowed to stand at 60° C. for 24 hours and then peeled off by hand, when the adhesive strength was measured as an initial adhesive strength. Subsequently, the cut piece of the pressure-sensitive adhesive optical film was immersed in hot water at 90° C. for 30 minutes and then peeled off by hand, when the adhesive strength was evaluated as an "adhesive strength after impression of peeling conditions" according to the following criteria.
◯: Peeling off was easily possible.
×: Peeling off was difficult, or the glass plate was broken during peeling off.

Examples and the Comparative examples was transferred onto a glass plate and then measured for total light transmittance (%) and haze (%) using a haze meter (manufactured by MURAKAMI COLOR RESEARCH LABORATORY). The results are shown in Table 2.

TABLE 1

| | Adhesive strength test (N/25 mm) | | | Peelability test | |
|---|---|---|---|---|---|
| | | Adhesive strength (B) after impression of peeling conditions | | | Adhesive strength after impression of peeling conditions |
| | Initial adhesive strength (A) | Immersion in hot water at 90° C. for 30 minutes | Heating at 130° C. for 3 minutes | Initial adhesive strength | |
| Example 1 | 12.1 | 4.8 | 6.0 | X | ◯ |
| Example 2 | 12.6 | 5.0 | — | X | ◯ |
| Example 3 | 14.8 | 6.1 | — | X | ◯ |
| Example 4 | 10.4 | 3.7 | — | X | ◯ |
| Example 5 | 13.1 | 4.9 | — | X | ◯ |
| Example 6 | 11.9 | 3.8 | — | X | ◯ |
| Example 7 | 6.4 | 1.6 | — | ◯ | ◯ |
| Comparative Examples 1 | 17.6 | 20.8 | (Broken) | X | X |
| Comparative Examples 2 | 0.6 | 0.3 | — | Not adhering | Not adhering |
| Comparative Examples 3 | 16.3 | 17.1 | — | X | X |
| Comparative Examples 4 | 14.5 | 14.5 | — | X | X |
| Comparative Examples 5 | 12.8 | 16.9 | — | X | X |

As is evident from the results in Table 1, the optical films obtained in the Examples according to the invention and the Comparative examples (exclusive of Comparative Example 2) each had a high initial adhesive strength and also showed a strong adhesive strength in the peelability test. In particular, Examples 1 to 6 and Comparative Examples 1 and 3 to 5 showed good adhesive strength. Example 7 showed a lower initial adhesive strength than the other examples. The optical film obtained in Comparative Example 2 was hardly attached to the glass plate.

To peel off the optical film, the optical film was immersed in hot water at 90° C. for 30 minutes. As a result, the adhesive strength of the optical film obtained in each of the Examples was reduced to 35 to 40% of the initial adhesive strength. Also in the test on peelability from the glass plate, the optical film was relatively easily peeled off. In contrast, even after the impression of the peeling conditions, Comparative Examples 1 and 3 to 5 showed no reduction in adhesive strength and contrarily showed an increase in adhesive strength. Also in the test on peelability from the glass plate, Comparative Examples 1 and 3 to 5 showed no reduction in adhesive strength. In particular, Comparative Example 1 showed the result that part of the optical film itself was broken.

(Total Light Transmittance and Haze)

The pressure-sensitive adhesive layer (25 μm in thickness) formed on the separator surface in each of the

TABLE 2

| | Total light transmittance | Haze |
|---|---|---|
| Example 1 | 92.2% | 0.3% |
| Example 2 | 92.3% | 0.3% |
| Example 3 | 92.5% | 0.2% |
| Example 4 | 91.1% | 1.9% |
| Example 5 | 92.0% | 0.8% |
| Example 6 | 91.8% | 0.9% |
| Example 7 | 86.1% | 8.2% |
| Comparative Examples 1 | 92.6% | 0.1% |
| Comparative Examples 2 | 92.3% | 0.1% |
| Comparative Examples 3 | 92.4% | 0.2% |
| Comparative Examples 4 | 92.4% | 0.2% |
| Comparative Examples 5 | 92.6% | 0.1% |

Table 2 shows high total light transmittances and low hazes except for those of Example 7. In fact, the pressure-sensitive adhesive obtained in Example 7 was slightly milky white.

(Peeling off Optical Film from Liquid Crystal Panel)

The pressure-sensitive adhesive optical film obtained in each of Example 1 and Comparative Example 1 was cut into a piece of a size of 150 mm×100 mm. Each cut piece was attached to one half of one side of a 12.1-inch size liquid crystal cell (the surface of the glass plate) and then subjected to the same peelability test. As a result, both films showed high initial adhesive strength and good adhesive strength. After immersed in hot water at 90° C. for 30 minutes, the optical film obtained in Example 1 was easily peeled off, but the optical film obtained in Comparative Example 1 remained adhering very strongly and was difficult to peel off.

The optical film obtained in each of Example 1 and Comparative Example 1 was attached to a glass plate to form a sample in the same manner as in the adhesive strength test. The sample was stored in a hot environment at 60° C. for 500 hours or in a humid environment at 40° C. and 92% RH for 500 hours. The sample was then taken out and measured for the adhesive strength using Autograph. The test conditions were the same as those in the adhesive strength test. The results are shown in Table 3.

TABLE 3

| | Durability test (N/25 mm) | | | |
|---|---|---|---|---|
| | 60° C. for 500 hours | | 40° C. and 92% RH for 500 hours | |
| | After taking out | After immersion in hot water at 90° C. for 30 minutes | After taking out | After immersion in hot water at 90° C. for 30 minutes |
| Examples 1 | 14.8 | 6.5 | 12.7 | 4.2 |
| Comparative Examples 1 | 24.2 | (Broken) | 20.0 | 20.4 |

Table 3 shows that after the storing in a hot environment at 60° C., the adhesive strengths of the samples of Example 1 and Comparative Example 1 increased by 20% and 35% from the initial adhesive strengths, respectively. Concerning Example 1, the adhesive strength of the sample was reduced to about 44% by the immersion in hot water, which shows that the adhesive strength-lowering effect according to the invention is preserved. In contrast, after the immersion in hot water, the optical film of Comparative Example 1 strongly adhered so that it could be broken during peeling off, which made it impossible to measure the adhesive strength.

In the humid environment at 40° C. and 92% RH, Example 1 showed almost no change in initial adhesive strength. In contrast, Comparative Example 1 showed an about 15% increase. After the humidification test, the adhesive strength of the sample of Example 1 was significantly reduced to 33% by the immersion in hot water compared to the sample not immersed, which also shows that the adhesive strength-lowering effect according to the invention is preserved. In contrast, the adhesive strength of Comparative Example 1 showed almost no change and remained high before and after the immersion in hot water.

From the above, it is apparent that even after the storing in a high-temperature environment or a high-temperature, high-humidity environment, the result obtained was similar to that of the initial adhesive strength test and the effect of the invention can be obtained. These high-temperature and high-temperature, high-humidity tests are generally recognized as acceleration tests for the evaluation of image displays and pressure-sensitive adhesives. The above results suggest that optical films can be peeled off from image displays after their life is ended, which would otherwise be impossible by conventional means.

The invention claimed is:

1. A pressure-sensitive adhesive composition, comprising:
a pressure sensitive adhesive base polymer; and
amphiphilic molecule particles,
wherein the amphiphilic molecule particles consist of aggregated amphiphilic molecules,
wherein the amphiphilic molecules have at least one hydrophilic group and at least one hydrophobic group in the same molecule,
wherein the amphiphilic molecule particles are in the pressure-sensitive adhesive base polymer,
wherein the base polymer is a (meth) acrylic-based polymer, and
wherein the pressure sensitive adhesive base polymer has a weight average molecular weight in the range of 1,000,000 to 3,000,000.

2. The pressure-sensitive adhesive composition according to claim 1, wherein the amphiphilic molecules are solid at 23° C. and 1 atm.

3. The pressure-sensitive adhesive composition according to claim 1, wherein the amphiphilic molecule particles are amphiphilic molecule crystals having a structure in which the aggregated amphiphilic molecules are aligned.

4. The pressure-sensitive adhesive composition according to claim 3, wherein the amphiphilic molecule crystals have a spherical, hollow spherical, hollow fibrous, or plate-shaped structure formed by self-assembly of the aggregated amphiphilic molecules.

5. The pressure-sensitive adhesive composition according to claim 1, wherein the amphiphilic molecule particles have an average major-axis length of 2 μm or less.

6. The pressure-sensitive adhesive composition according to claim 1, wherein the amphiphilic molecule particles have dimensions along XYZ coordinate axes perpendicular to one another, and when the particles have a major axis along the X-axis, the particles have dimensions of 400 nm or less along at least two of the coordinate axes.

7. The pressure-sensitive adhesive composition according to claim 1, which comprises 0.01 to 10 parts by weight of the amphiphilic molecule particles based on 100 parts by weight of the base polymer.

8. The pressure-sensitive adhesive composition according to claim 1, further comprising a crosslinking agent.

9. The pressure-sensitive adhesive composition according to claim 1,
wherein the hydrophilic group of the amphiphilic molecule contains a polyhydric alcohol moiety, a carboxyl group, a sulfone group, an amino group, a phosphoric acid group, a sulfate ester group, or a phosphate ester group.

10. The pressure-sensitive adhesive composition according to claim 9, wherein the amphiphilic molecule is selected from the group consisting of a compound having a polyhydric alcohol moiety or a phosphoric acid group as the hydrophilic group and a saturated or unsaturated hydrocarbon chain as the hydrophobic group.

11. The pressure-sensitive adhesive composition according to claim 1,
wherein the hydrophilic and hydrophobic groups are attached directly or through an ester bond, an ether bond, an amide bond, an arylene group, or an aryleneoxy group.

12. The pressure-sensitive adhesive composition according to claim 11,
wherein the amphiphilic molecule contains N-glycoside glycolipids represented by general formula (2):

wherein G represents a sugar residue obtained by removing a hemiacetal hydroxyl group attached to an anomeric carbon from a sugar, and R represents an unsaturated hydrocarbon group of 10 to 39 carbon atoms;
asymmetric two-headed lipids (bolalipids) represented by general formula (3):

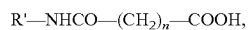

wherein R' represents a residue obtained by removing a reducing terminal hydroxyl group from an aldopyranose, and n represents a number of 6 to 20;

O-glycoside glycolipids having a structure represented by general formula (4):

G'—O—Ph—R'', wherein G' represents a sugar residue, Ph represents a phenyl group, and R'' represents a hydrocarbon group of 6 to 25 carbon atoms;

or a compound composed of a transition metal and a peptide lipid represented by general formula (5):

R'''CO(NHCH$_2$CO)$_m$OH, wherein R''' represents a hydrocarbon group of 6 to 18 carbon atoms, and m represents an integer of 1 to 3.

13. The pressure-sensitive adhesive composition according to claim 1, wherein the amphiphilic molecule is selected from the group consisting of fatty acids, straight-chain alkylbenzenes, higher alcohols, alkylphenols, alpha-olefins, alkylglucosides, sucrose fatty acid esters, sorbitan fatty acid esters, or polyoxyethylene sorbitan fatty acid esters.

14. The pressure-sensitive adhesive composition according to claim 13, wherein the amphiphilic molecule is higher alcohols.

15. The pressure-sensitive adhesive composition according to claim 13, wherein the higher alcohols are polyoxyethylene alkyl ethers.

16. The pressure-sensitive adhesive composition according to claim 15, wherein the polyoxyethylene alkyl ethers are represented by general formula (1): $C_mH_{2m+1}$—O—(CH$_2$—CH$_2$—O)$_n$—H, wherein m is the number of carbon atoms in the alkyl group, and n is the mole number of added ethylene oxide, and m is in the range of 10 to 20.

17. The pressure-sensitive adhesive composition according to claim 13, wherein the amphiphilic molecule is sorbitan fatty acid esters.

18. The pressure-sensitive adhesive composition according to claim 17, wherein the sorbitan fatty acid esters contain at least one selected from the group consisting of sorbitan monopalmitate, sorbitan monostearate, sorbitan tristearate, polyoxyethylene sorbitan monostearate, polyoxyethylene sorbitan tristearate, and polyoxyethylene cetyl ether.

19. The pressure-sensitive adhesive composition according to claim 1, wherein the pressure sensitive adhesive base polymer has a weight average molecular weight in the range of 1,500,000 to 2,500,000.

20. The pressure-sensitive adhesive composition according to claim 1, wherein the pressure sensitive adhesive base polymer has a weight average molecular weight in the range of 1,700,000 to 2,500,000.

21. The pressure-sensitive adhesive composition according to claim 1, wherein the pressure sensitive adhesive base polymer has a weight average molecular weight in the range of 1,800,000 to 2,500,000.

22. A pressure-sensitive adhesive layer made from the pressure-sensitive adhesive composition according to claim 1.

23. The pressure-sensitive adhesive layer according to claim 22, which has a total light transmittance of 88% or more and a haze of 3% or less, when applied with a thickness of 25 μm to a transparent glass plate and measured in a dry state.

24. A pressure-sensitive adhesive member, comprising:
a support base material; and
the pressure-sensitive adhesive layer according to claim 22 provided on one or both sides of the support base material.

25. The pressure-sensitive adhesive member according to claim 24, wherein when the pressure-sensitive adhesive layer is attached to a glass substrate, the adhesive strength (A) of the pressure-sensitive adhesive layer is reduced to an adhesive strength (B) which is ½ or less of the adhesive strength (A) by an impression of heating the pressure-sensitive adhesive layer at 100° C. or more for 1 minute or more or of immersing the pressure-sensitive adhesive layer in hot water at 80° C. or more for 1 minute or more.

26. The pressure-sensitive adhesive member according to claim 24, wherein the support base material is an optical film.

27. An image display, comprising at least one piece of the pressure-sensitive adhesive member according to claim 26.

28. The image display according to claim 27, wherein the pressure-sensitive adhesive layer of the pressure-sensitive adhesive member according to claim 26 is directly attached to a glass substrate.

29. An image display, comprising:
an optical film;
a display panel; and
the pressure-sensitive adhesive layer according to claim 22 with which the optical film and the display panel are attached together.

30. A method for peeling off an optical film from an image display, comprising:
providing an image display comprising an optical film, a display panel and the pressure-sensitive adhesive layer according to claim 22 with which the optical film and the display panel are attached together;
subjecting the image display to an impression of heating at 100° C. or more for 1 minute or more or of immersion in hot water at 80° C. or more for 1 minute or more so that the pressure-sensitive adhesive layer can have a reduced adhesive strength; and
then peeling off the optical film from the display panel.

31. The method according to claim 30, wherein the adhesive strength of the pressure-sensitive adhesive layer after the impression is reduced to ½ or less of the adhesive strength of the pressure-sensitive adhesive layer before the impression by the impression.

32. A method for removing a display panel from an image display, comprising:
providing an image display comprising an optical film, a display panel and the pressure-sensitive adhesive layer according to claim 22 with which the optical film and the display panel are attached together;
subjecting the image display to an impression of heating at 100° C. or more for 1 minute or more or immersion in hot water at 80° C. or more for 1 minute or more so that the pressure-sensitive adhesive layer can have a reduced adhesive strength; and
then peeling off the optical film from the display panel to remove the display panel.

33. The method according to claim 32, wherein the adhesive strength of the pressure-sensitive adhesive layer after the impression is reduced to ½ or less of the adhesive strength of the pressure-sensitive adhesive layer before the impression by the impression.

* * * * *